US007698058B2

(12) United States Patent
Chen et al.

(10) Patent No.: US 7,698,058 B2
(45) Date of Patent: Apr. 13, 2010

(54) SYSTEM, METHOD AND APPARATUS FOR SEARCHING GEOGRAPHIC AREA USING PRIORITIZED SPATIAL ORDER

(75) Inventors: Susan S. Chen, Chandler, AZ (US); Clayton E. Barber, Independence, MO (US)

(73) Assignee: Garmin International, Inc., Olathe, KS (US)

( * ) Notice: Subject to any disclaimer, the term of this patent is extended or adjusted under 35 U.S.C. 154(b) by 146 days.

(21) Appl. No.: 11/965,525

(22) Filed: Dec. 27, 2007

(65) Prior Publication Data

US 2008/0103691 A1 May 1, 2008

Related U.S. Application Data

(63) Continuation of application No. 10/720,371, filed on Nov. 24, 2003, now Pat. No. 7,386,373, which is a continuation-in-part of application No. 10/337,598, filed on Jan. 7, 2003, now Pat. No. 6,745,115.

(51) Int. Cl.
   *G05D 1/00* (2006.01)
(52) U.S. Cl. .............................. 701/207; 701/9; 342/65; 342/26 R; 342/104; 340/945
(58) Field of Classification Search ................. 701/207, 701/9, 301; 340/963, 970, 988, 971, 961, 340/945; 375/240.16; 382/236; 348/416.1; 342/65, 26 R, 195, 38, 104; *G05D 1/00*
   See application file for complete search history.

(56) References Cited

U.S. PATENT DOCUMENTS

| 3,668,623 | A | 6/1972 | Csaposs ..................... 340/976 |
| 4,071,843 | A | 1/1978 | Marien ........................... 343/5 |
| 4,224,669 | A | 9/1980 | Brame ........................ 264/433 |
| 4,319,218 | A | 3/1982 | Bateman ....................... 340/27 |
| 4,433,323 | A | 2/1984 | Grove ......................... 340/970 |
| 4,484,192 | A | 11/1984 | Seitz et al. .................. 340/995 |
| 4,495,483 | A | 1/1985 | Bateman ..................... 340/970 |
| 4,567,883 | A | 2/1986 | Langer et al. ............... 128/696 |
| 4,639,730 | A | 1/1987 | Paterson et al. ............. 340/970 |
| 4,646,244 | A | 2/1987 | Bateman et al. ............. 364/461 |
| 4,675,823 | A | 6/1987 | Noland ....................... 364/460 |
| 4,684,948 | A | 8/1987 | Bateman ..................... 340/970 |
| 4,792,799 | A | 12/1988 | Grove ......................... 340/970 |
| 4,818,992 | A | 4/1989 | Paterson ..................... 340/970 |
| 4,849,756 | A | 7/1989 | Bateman ..................... 340/970 |
| 4,857,923 | A | 8/1989 | Bateman ..................... 340/970 |
| 4,894,655 | A | 1/1990 | Joguet et al. ................ 340/988 |
| 4,903,212 | A | 2/1990 | Yokouchi et al. ............ 364/449 |
| 4,914,436 | A | 4/1990 | Bateman et al. ............. 340/970 |

(Continued)

*Primary Examiner*—Tuan C To
(74) *Attorney, Agent, or Firm*—Samuel M. Korte

(57) ABSTRACT

A spatial data search method, system and apparatus for identifying particular data of significance around a reference vector through the spatial data. The method involves determining a reference vector within a spatial region for which spatial data exists, loading a portion of the spatial data including the data around the reference vector into a memory buffer, and searching the spatial data in a prioritized order. The method, system and apparatus have particular utility in searching geographic data for a terrain awareness and warning system ("TAWS") and display in an aircraft. Embodiments of the present invention provide advantages over existing sequential and radial search methods, significantly reducing the processing and calculations required and providing faster alerts to pilots.

17 Claims, 8 Drawing Sheets

U.S. PATENT DOCUMENTS

| | | | | |
|---|---|---|---|---|
| 4,916,448 | A | 4/1990 | Thor | 340/970 |
| 4,939,513 | A | 7/1990 | Paterson et al. | 340/970 |
| 4,940,987 | A | 7/1990 | Frederick | 342/26 |
| 4,951,047 | A | 8/1990 | Paterson et al. | 340/970 |
| 4,980,684 | A | 12/1990 | Paterson et al. | 340/970 |
| 4,987,413 | A | 1/1991 | Grove | 340/970 |
| 5,001,476 | A | 3/1991 | Vermilion et al. | 340/970 |
| 5,038,141 | A | 8/1991 | Grove | 340/970 |
| 5,075,685 | A | 12/1991 | Vermilion et al. | 340/970 |
| 5,086,396 | A | 2/1992 | Waruszewski, Jr. | 364/454 |
| 5,136,512 | A | 8/1992 | Le Borne | 364/461 |
| 5,140,532 | A | 8/1992 | Beckwith, Jr. et al. | 395/101 |
| 5,153,588 | A | 10/1992 | Muller | 340/968 |
| 5,166,682 | A | 11/1992 | Bateman | 340/970 |
| 5,187,478 | A | 2/1993 | Grove | 340/970 |
| 5,192,208 | A | 3/1993 | Ferguson et al. | 434/2 |
| 5,196,847 | A | 3/1993 | Bateman | 340/970 |
| 5,202,690 | A | 4/1993 | Frederick | 342/26 |
| 5,220,322 | A | 6/1993 | Bateman et al. | 340/970 |
| 5,265,025 | A | 11/1993 | Hirata | 364/449 |
| 5,293,318 | A | 3/1994 | Fukushima | 364/449 |
| 5,369,589 | A | 11/1994 | Steiner | 364/449 |
| 5,392,048 | A | 2/1995 | Michie | 342/26 |
| 5,398,712 | A | 3/1995 | Wang et al. | 137/15.06 |
| 5,410,317 | A | 4/1995 | Ostrom et al. | 342/65 |
| 5,414,631 | A | 5/1995 | Denoize et al. | 364/461 |
| 5,420,582 | A | 5/1995 | Kubbat et al. | 340/974 |
| 5,442,556 | A | 8/1995 | Boyes et al. | 364/433 |
| 5,448,233 | A | 9/1995 | Saban et al. | 340/963 |
| 5,448,241 | A | 9/1995 | Zeoli et al. | 342/25 |
| 5,485,156 | A | 1/1996 | Manseur et al. | 342/77 |
| 5,488,563 | A * | 1/1996 | Chazelle et al. | 701/301 |
| 5,495,249 | A | 2/1996 | Chazelle et al. | 342/36 |
| 5,511,153 | A | 4/1996 | Azarbayejani et al. | 345/419 |
| 5,519,392 | A | 5/1996 | Oder et al. | 340/995 |
| 5,638,282 | A | 6/1997 | Chazelle et al. | 364/461 |
| 5,661,486 | A | 8/1997 | Faivre et al. | 342/33 |
| 5,677,842 | A * | 10/1997 | Denoize et al. | 701/301 |
| 5,781,126 | A | 7/1998 | Peterson et al. | 340/970 |
| 5,798,712 | A | 8/1998 | Coquin | 340/970 |
| 5,839,080 | A | 11/1998 | Muller et al. | 701/9 |
| 5,864,307 | A * | 1/1999 | Henley | 340/964 |
| 5,884,223 | A * | 3/1999 | Tognazzini | 701/301 |
| 5,892,462 | A | 4/1999 | Tran | 364/961 |
| 5,936,552 | A * | 8/1999 | Wichgers et al. | 340/963 |
| 6,002,347 | A | 12/1999 | Daly et al. | 340/963 |
| 6,038,498 | A | 3/2000 | Briffe et al. | 701/3 |
| 6,043,758 | A | 3/2000 | Snyder, Jr. et al. | 340/970 |
| 6,076,042 | A | 6/2000 | Tognazzini | 701/301 |
| 6,088,634 | A | 7/2000 | Muller et al. | 701/9 |
| 6,088,654 | A | 7/2000 | Lepere et al. | 701/301 |
| 6,092,009 | A | 7/2000 | Glover | 701/14 |
| 6,122,570 | A | 9/2000 | Muller et al. | 701/9 |
| 6,125,432 | A | 9/2000 | Hanani et al. | 711/157 |
| 6,127,944 | A | 10/2000 | Daly et al. | 340/963 |
| 6,138,060 | A | 10/2000 | Conner et al. | 701/9 |
| 6,216,064 | B1 | 4/2001 | Johnson et al. | 701/4 |
| 6,219,592 | B1 | 4/2001 | Muller et al. | 701/9 |
| 6,233,522 | B1 | 5/2001 | Morci | 701/208 |
| 6,292,721 | B1 | 9/2001 | Conner et al. | 701/9 |
| 6,304,800 | B1 | 10/2001 | Ishihara et al. | 701/16 |
| 6,347,263 | B1 | 2/2002 | Johnson et al. | 701/14 |
| 6,433,729 | B1 | 8/2002 | Staggs | 342/29 |
| 6,489,916 | B2 | 12/2002 | Block | 342/65 |
| 6,567,728 | B1 * | 5/2003 | Kelly et al. | 701/9 |
| 6,690,298 | B1 | 2/2004 | Barber et al. | 340/971 |
| 6,745,115 | B1 | 6/2004 | Chen | 701/9 |
| 6,765,965 | B1 | 7/2004 | Hanami et al. | 375/240.16 |
| 6,778,605 | B1 * | 8/2004 | Hamanaka | 375/240.16 |
| 6,793,173 | B2 | 9/2004 | Salesse-Lavergne | 22/17.13 |
| 6,879,280 | B1 | 4/2005 | Bull et al. | 342/26 B |
| 6,995,690 | B1 | 2/2006 | Chen et al. | 340/974 |
| 7,064,680 | B2 * | 6/2006 | Reynolds et al. | 340/961 |
| 7,123,749 | B2 * | 10/2006 | Parker | 382/106 |
| 7,162,367 | B2 * | 1/2007 | Lin et al. | 701/220 |
| 2001/0056316 | A1 * | 12/2001 | Johnson et al. | 701/14 |
| 2002/0041631 | A1 | 4/2002 | Arita et al. | 375/240.16 |
| 2002/0089432 | A1 | 7/2002 | Staggs et al. | 340/945 |
| 2002/0131500 | A1 | 9/2002 | Gandhi et al. | 375/240.16 |
| 2003/0063673 | A1 | 4/2003 | Riemens et al. | 375/240.16 |
| 2003/0107499 | A1 | 6/2003 | Lepere et al. | 340/945 |
| 2003/0225489 | A1 | 12/2003 | Tsao | 701/9 |
| 2005/0007270 | A1 | 1/2005 | Block | 342/65 |
| 2005/0105616 | A1 | 5/2005 | Kim et al. | 375/240.12 |

* cited by examiner

FIG. 3

SYSTEM, METHOD AND APPARATUS FOR SEARCHING GEOGRAPHIC AREA USING PRIORITIZED SPATIAL ORDER

RELATED APPLICATIONS

The present application is a continuation and claims priority benefit of an earlier-filed U.S. patent application entitled "System, Method and Apparatus for Searching Geographic Area Using Prioritized Spatial Order", Ser. No. 10/720,371, filed Nov. 24, 2003, which is a continuation-in-part and claims priority benefit, with regard to all common subject matter, of an earlier-filed U.S. patent application entitled "System, Method and Apparatus for Searching Geographic Area Using Prioritized Spatial Order", Ser. No. 10/337,598, filed Jan. 7, 2003, now U.S. Pat. No. 6,745,115. The above referenced applications are incorporated herein by specific reference.

BACKGROUND OF THE INVENTION

1. Technical Field

The present invention generally relates to searching data relating to a spatial region using a prioritized search order, and more particularly to a Terrain Awareness Warning System ("TAWS") for use by an aircraft for searching terrain elevation data for a geographic area to determine aircraft terrain clearance.

2. Background Art

Various systems are known in the art that provide warnings and advisory indications of hazardous flight conditions. Among such systems are systems generally known as Ground Proximity Warning Systems ("GPWS") which monitor the flight conditions of an aircraft and provide a warning if flight conditions are such that inadvertent contact with terrain is imminent. Among flight conditions normally monitored by such systems are radio altitude and rate, barometric altitude and rate, air speed, and flap and gear positions. These parameters are monitored and an advisory signal and/or warning signal is generated when the relationship between the parameters is such that terrain impact is likely to occur.

Other systems improve upon earlier GPWS by utilizing ground-based navigational information. Monitoring stored terrain data and providing modified ground proximity warnings may provide more accurate warnings. U.S. Pat. Nos. 4,646,244, and 4,675,823 each disclose terrain advisory systems that utilize ground-based navigational systems and stored terrain data to provide various ground proximity warnings in relation to the position of the aircraft. U.S. Pat. No. 5,839,080 discloses a Global Positioning System ("GPS") and stored terrain data to provide warning indications.

Satellite-based navigational systems, such as GPS, which can track longitude, latitude, altitude, groundtrack, and ground speed, are becoming an important and reliable source of information for aircraft. An aircraft's Forward Looking Terrain Avoidance ("FLTA") system looks ahead of the aircraft during flight along and below the aircraft's lateral and vertical flight path to provide suitable alerts if a potential threat exists of the aircraft colliding or coming too close to terrain. The computation involves searching through a terrain database for terrain cells that are within the search area and violate the Required Terrain Clearance ("RTC"). The RTC is the value set by the Federal Aviation Administration as the permitted flight "floor" for various phases of aircraft flight. The RTC indicates the clearance distance from terrain below which the aircraft should not fly. Searching the search area and finding the cells in violation is expensive in both processor and memory resources.

Two common methods of searching terrain data are sequential and radial. Both of these methods suffer from the deficiency that they expend precious processor and memory resources. For the sequential search method, some common deficiencies include: First, every cell in a rectangular area encompassing the search area is searched, even those cells that are outside the search area boundary. This requires a determination of whether a cell is within the search area or not, which could be complicated and expensive. Second, a large data buffer is needed to store the cells found during the search, the dimension of the buffer needed is difficult to determine accurately because the upper bound could equal the size of the search area which varies by the speed of the plane. Third, sorting the cells in the result buffer by distance to the aircraft position is expensive, especially if a large number of cells are returned in the search and if both distance and bearing are considered.

For the radial search method, some common deficiencies include: First, many possible flight directions are searched, even some of those that are highly unlikely. This requires expensive processing time to be spent on searching all flight directions even when the aircraft is flying straight. Second, because the search is performed in a plurality of radial arms originating at the same point and extending in a fan shape over the underlying data sectioned into a square grid, many cells near the origin of the arms are searched numerous times, and some cells farther from the origin are potentially missed if the radial arms become too far apart at their extents. Third, the position of each point on each radial arm is calculated and terrain data is searched throughout the full database. This is complicated and expensive. Fourth, a large data buffer is needed to store the cell identities found during the search, and the dimension of the buffer needed is difficult to determine accurately because the upper bound could equal the full number of the search points on all radial arms. Fifth, in systems which sort the results, sorting the cells in the result buffer by distance to the aircraft position is expensive, especially if a large number of cells is returned in the search and if both distance and bearing are considered.

Both conventional systems require extensive processor search time and memory storage for crucial Terrain Awareness and Warning systems ("TAWS"), for which the costs of developing, repairing and maintaining are increasing. The additional time required for these searches also reduces the time available for the processor to perform other tasks and lengthens the time in which search results can be made available to a pilot of the aircraft.

DISCLOSURE OF THE INVENTION

The present invention relates to methods, apparatus and a system for searching spatial data in a prioritized manner. In a general form of the invention, spatial data along and adjacent to a search vector is searched by storing a portion of a larger spatial information database into a smaller memory buffer and searching the buffer in a predetermined prioritized order. Different from conventional methods of searching spatial data, particular embodiments of the present invention search the data in the memory buffer in a non-linear order along and adjacent to a search vector, comparing spatial data values stored in select memory cells of the buffer with a predetermined search criteria. The identity of each cell searched which stores a value meeting the search criteria is included in an alert list which, when the length of the list equals a predetermined list length, is used to calculate an alert status for each cell on the list. Each cell in the memory buffer is searched no more than once for each alert cycle. Subsequent cycles may search using the same predetermined search order along the search vector, or a different predetermined search order.

Embodiments of the present invention are also particularly useful for searching geographic terrain data for use with TAWS for aircraft. By reference to a satellite navigation reference signal and possibly other signals that provide an indication of an aircraft's altitude, location and direction of travel, a processor determines a search vector in relation to the aircraft's coordinates. The processor accesses a geographic terrain information database and stores elevation data corresponding to the spatial area portion of the database representing the geography over which the aircraft is traveling in a memory buffer. Using a predetermined prioritized order for searching the cells of the memory buffer along the search vector, the processor compares the aircraft's projected altitude at each cell with the elevation value stored in the cell plus an appropriate RTC value for the flight phase (elevation+ RTC="clearance elevation"). Particular embodiments of the invention employ a non-linear prioritized order. For all searched cells where the projected altitude of the aircraft is less than the clearance elevation at that cell, the identities of the cells are stored in an alert list until the list is full or the predetermined order is finished. When a predetermined number of alert list elements have been recorded, the processor, in association with a look-ahead warning generator, provides either caution or warning alert indicators to a pilot of the aircraft based upon a separate time-related analysis of the data. The alert indicators may be visual, aural, or both. Embodiments of the invention employ a select number of predetermined search patterns between which a selection is made and implemented for an alert cycle depending upon an exterior criteria such as a pilot's actions or the aircraft's movements. In particular embodiments of the invention, the predetermined search pattern searches a few cells in the direction of the flight path, then back-steps and searches unsearched cells adjacent the flight path, then returns to the flight path and searches at least one next unsearched cell in the flight path, then again searches unsearched cells adjacent the flight path.

Particular advantages of the present invention are found in significantly reduced processing and computation requirements for system resources employing embodiments of the present invention for use in spatial data searching. By storing a relevant portion of the larger terrain information database in a smaller memory buffer, less data needs to be accessed and dismissed to find relevant data, significantly reducing the calculations needed. By searching the cells of the memory buffer no more than once per alert cycle and in a predetermined prioritized order, the alert list is automatically prioritized and cell data is not searched repeatedly. By searching each memory buffer cell using a single simple comparison, searching the search region only until the alert list reaches a predetermined number of cells, and performing a time-related analysis on the significantly shorter list of cells rather than the entire database, even further processing and calculation savings is achieved as well as providing and displaying relevant alert information to the pilots more quickly.

The foregoing and other features and advantages of the present invention will be apparent from the following more detailed description of the particular embodiments of the invention, as illustrated in the accompanying drawings.

BRIEF DESCRIPTION OF THE DRAWINGS

FIG. 3 is a representation of a spatial data grid indicating a prioritized search order of the vector and search area according to an embodiment of the present invention;

DETAILED DESCRIPTION OF EMBODIMENTS OF THE INVENTION

As discussed above, embodiments of the present invention relate to searching spatial region data using a prioritized search order. One embodiment of the invention relates specifically to a Terrain Awareness Warning System ("TAWS") for use by an aircraft for searching terrain elevation data.

The purpose of a FLTA function of an aircraft is to predict whether the aircraft is heading toward terrain that will cause the terrain clearance to be less than the clearance required by federal guidelines. The Federal Aviation Administration ("FAA") establishes minimum terrain clearance levels that must be maintained for safety. The precise minimum clearance levels required for any given situation depends upon the type of aircraft, flight pattern, and the like. The FAA also determines minimum performance standards for TAWS equipment used by an aircraft. One example of FAA TAWS equipment standards may be found in the Technical Standard Order TSO-C151a issued in November 1999 by the FAA.

Embodiments of the present invention reduce the amount of data which must be stored by a TAWS to operate properly, and reduce the number of terrain data cells which must be searched for a useful result by focusing upon the cells containing data most important to the aircraft; those directly in front of and immediately adjacent to the aircraft's flight path. As is explained further herein, methods of searching spatial data according to embodiments of the present invention are also applicable to searching other spatial data sets where a primary area of importance is identified and a prioritized data search is desired.

Figure 1:
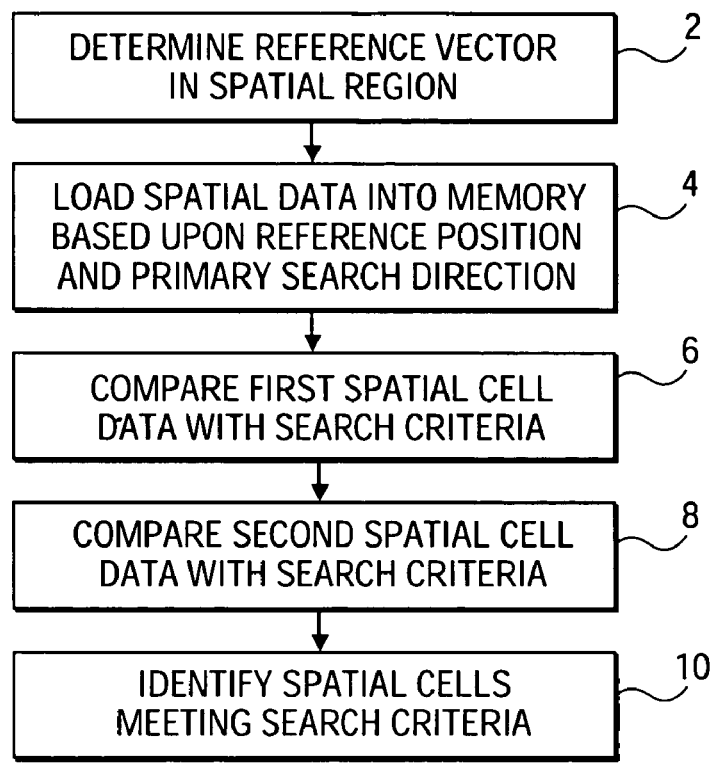
FIG. 1 is a flow diagram illustrating a general method of searching spatial data according to an embodiment of the present invention.
Figure 2:
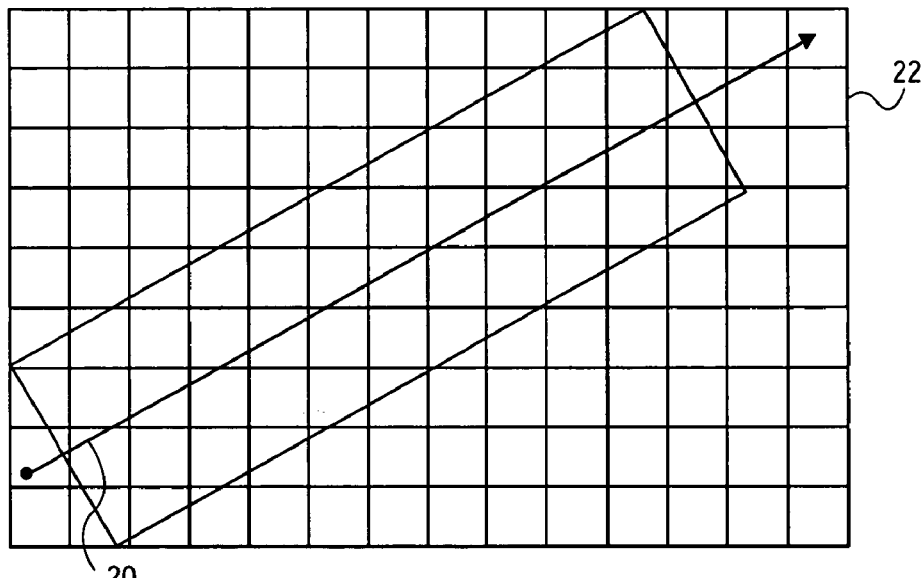
FIG. 2 is a representation of a spatial data grid indicating a vector and search area of interest.

Referring to FIGS. 1 and 2, a method of searching spatial data in a prioritized manner is shown. The method is useful for searching spatial data from a database including at least one value stored in association with each of a plurality of information records associated with a spatial region. A reference vector 20 within the spatial region 22 is determined (Step 2), and spatial data from a spatial database is accessed which corresponds to a starting point of the search. Spatial data corresponding to the determined spatial region 22 is loaded from the database to a spatial memory buffer based upon the starting reference position and primary search direction of the reference vector 20 (Step 4). By loading a smaller region of relevant data from the spatial information database into a separate memory buffer, the smaller relevant data region may be searched more quickly. In a first embodiment of the invention, the smaller region of relevant data is stored in the memory buffer according to its orientation with respect to the spatial information database. In this embodiment, while the general order of cells to be searched in relation to the search vector is predetermined, the specific order of cell identities to be searched depends upon the orientation of the search vector in relation to the spatial information database. This significantly reduces the amount of calculations necessary compared with conventional spatial or radial search systems which calculate the position of each desired search cell for each point to search and then locate that cell from the entirety of the database.

The general process for searching the spatial data once it is loaded into the memory buffer is to search along the vector in an order which focuses upon the most important and closest cells first, those being the cells along and adjacent to the search vector. In many cases, when searching data associated with spatial coordinates, data of interest relates to or is expected near a particular path through a spatial region. For these cases, search methods of the present invention are particularly useful. In simple terms, the method involves searching a few cells along a vector path, then back-stepping and searching a few cells immediately adjacent the vector path, then returning to the next one or two unsearched cells ahead along the vector path, then searching the next unsearched cells adjacent vector path. In this way, the order of the search through the cells, and thus the spatial region data stored in the buffer, may be numbered. Each sequential search cycle may be performed in the same order through the memory buffer data, each search computation relating only to the data value, search criteria and the cell location in relation to the originating cell. By searching in this manner, the most important cells, those along the vector path are searched first, but the cells adjacent the vector path are not left until last. The adjacent cells are intermixed in the search order with those cells immediately on the vector path to provide a prioritized search pattern. Those cells that are beyond a predetermined distance from the vector path 20 are not searched through this method.

Data from the first spatial cell is compared with the search criteria (Step 6). If the data meets the search criteria, the cell identity is stored in an alert list. Data from the second spatial cell is then compared with the search criteria (Step 8), and the cell identity is stored if the data meets the search criteria. This comparison process continues until a predetermined number of cell identities, or elements, have been identified and included in the alert list (Step 10).

Figure 3:
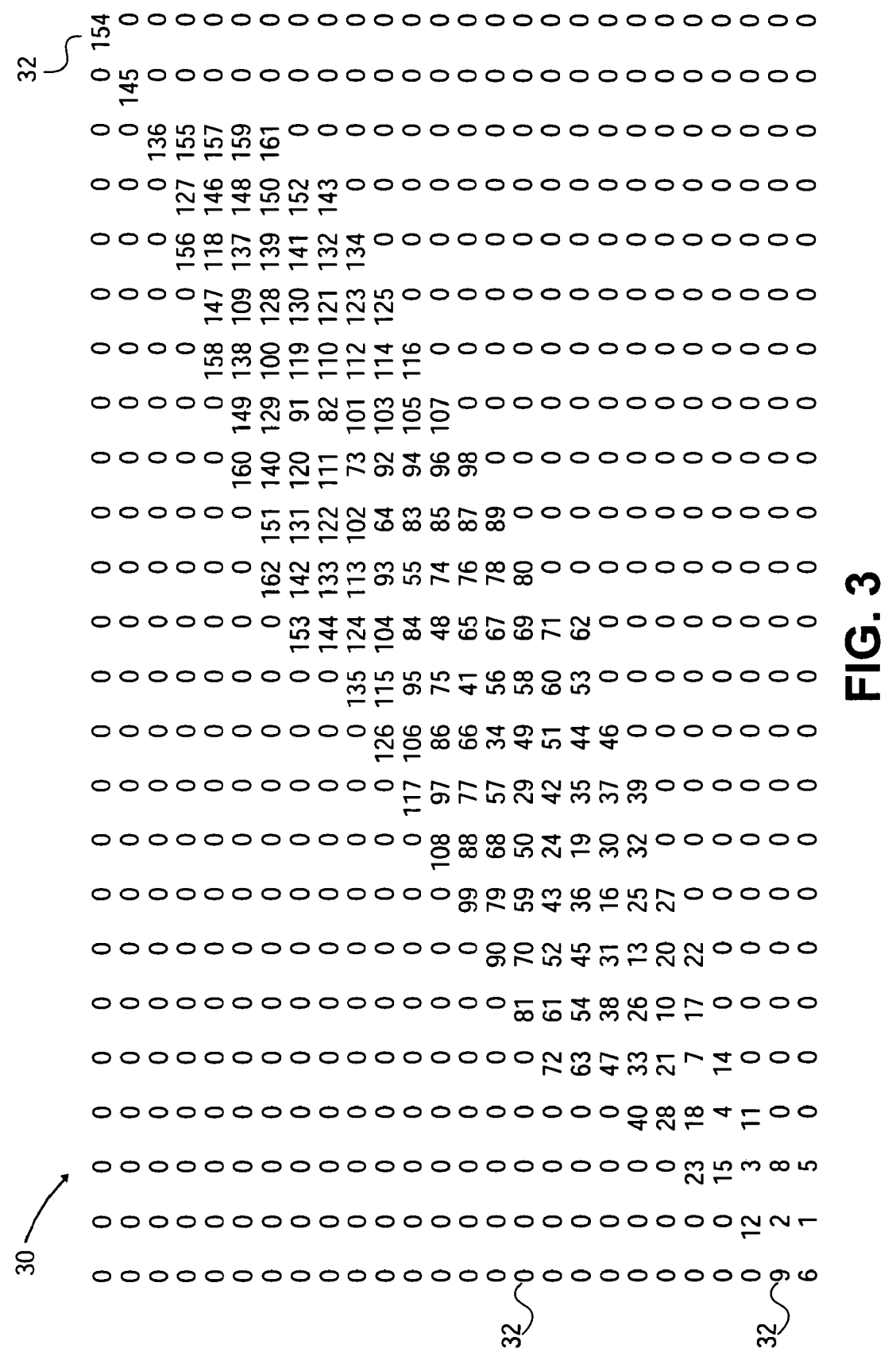

FIG. 3 illustrates an exemplary prioritized search order for a 24×26 memory buffer cell array 30 for storing data associated with a spatial region. The numbers in the rows and columns indicate the order in which the cell 32 will be searched for data meeting the search criteria. Notice that the search pattern order searches along a primary search path for four cells, returns to search the two adjacent cells on either side of the first cell, returns to search the next unsearched cell along the primary search path, then returns to search the two adjacent cells on either side of the second searched cell. This pattern continues until the end of the memory buffer cell region is reached; adding additional searches to widen the search area for a section in the middle of the memory buffer. The widened search area in the middle of the buffer search is to account for some deviation in the vector, but still maintains a prioritized order for the search. The cells 32 which are outside the desired search region (element 22 from FIG. 2) are identified in FIG. 3 by a zero ("0") to indicate they are not searched. Each time data in a cell 32 is found to meet the search criteria, whatever it may be, the cell is included in an alert list. As will be clear to those of ordinary skill in the art, the alert list is prioritized as to its relevance to the search by virtue of the original search being a prioritized search. Thus, the alert list need not be reordered by a subsequent analysis. As explained previously, the spatial data stored in the memory buffer array 30 may be stored so that the path of the search vector through the buffer space differs by the direction of the search vector through the spatial region. Those of ordinary skill in the art will readily understand how to construct an appropriate search algorithm for data stored in the memory buffer by either order to search select cells by their positional relationship to the search vector regardless of the position or orientation of the vector. The cells listed in the alert list are already in priority order of those closest to the search vector origin, or some similar priority, depending upon the precise priority order in which the region is searched.

Figure 4:
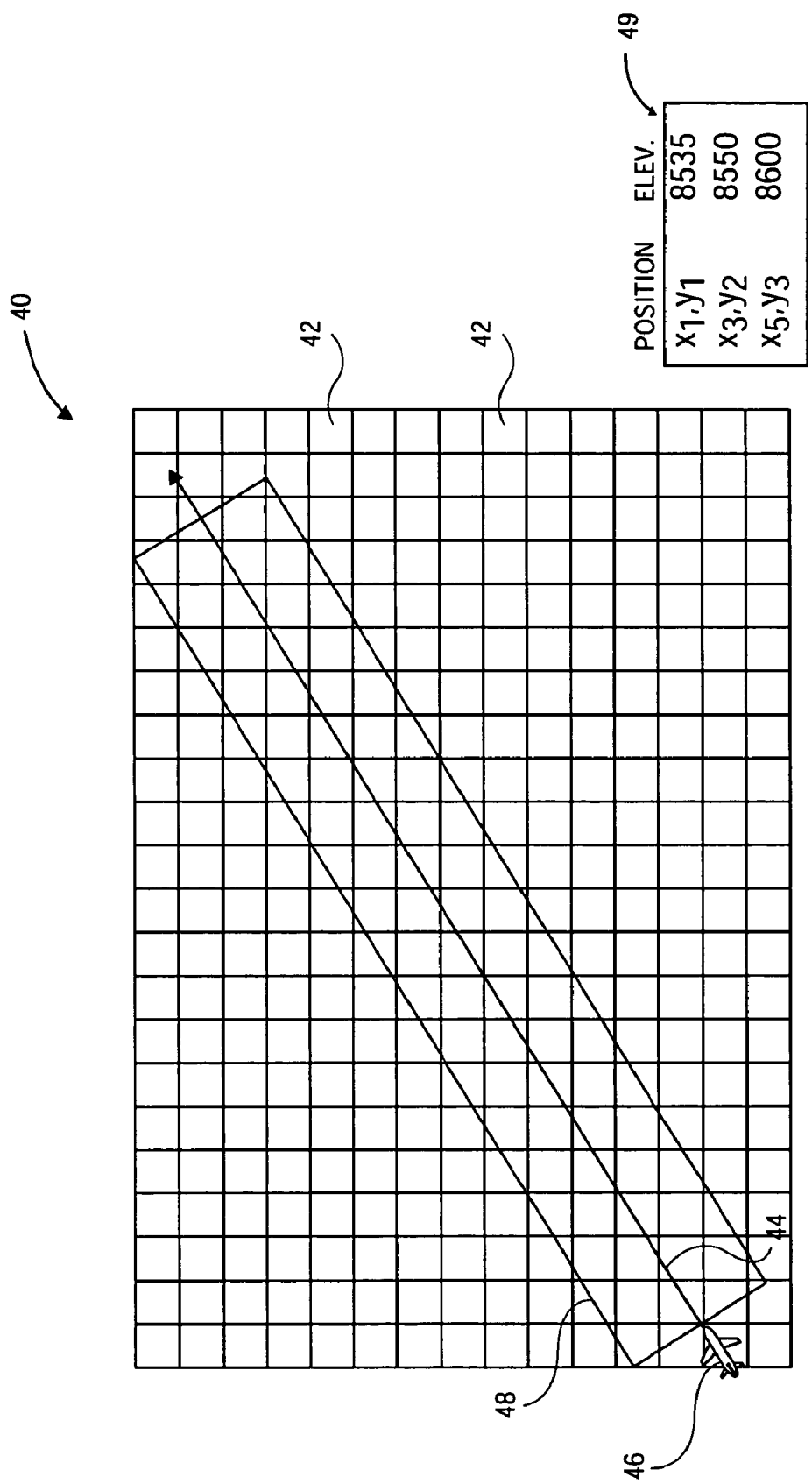
FIG. 4 is a representation of a geographic information data grid indicating an aircraft flight path and area immediately adjacent to the flight path.

FIG. 4 illustrates a particular application of the general method of searching spatial data for use with searching geographic terrain data in a TAWS for an aircraft. Much like the spatial data search for the search method described with reference to FIGS. 1-3, a search vector is determined for searching data through a spatial region. For the present embodiment for use with a TAWS, a look-ahead distance is determined based upon the speed of the aircraft. For example, if at least 90 seconds of warning is desired, the speed of the aircraft would be multiplied by 90 seconds to provide an equivalent look-ahead distance. Based upon the flight direction of the aircraft, a look-ahead point location is calculated directly in front of the aircraft at the look-ahead distance. A search vector is established between the aircraft's current location and the look-ahead point. A subset of data from the geographic terrain database is then stored in a spatial data buffer for searching. The subset of data is selected to include at least a region of data encompassing the terrain data relevant to the terrain along and adjacent to the search vector.

The terrain data stored in the geographic terrain database is stored according to latitudinal and longitudinal positions. Accordingly, and because the earth is not a perfect sphere, the spatial area represented by each database subdivision is not exactly identical as far as its actual dimensions, and is not exactly a square or rectangular region. Thus, the geographic region represented by each cell in the memory buffer varies by region. Since the earth is approximately an ellipsoid, if the earth's surface is divided into latitude/longitude grids, the area that each grid represents will get smaller towards the pole. In an effort to keep the variation to a minimum, embodiments of the present invention divides the earth's surface into latitude bands. For example, 0 to N 60, N60 to N 71, N 71 to N 76, etc. to make groupings of longitude divisions. Even so, the size of the cell still varies to a degree, with a grid size of approximately 0.25 square nautical miles being around the equator. However, the size of the cells does not have significant effect on the searching method used herein. Other smaller and larger cell sizings and geographical representations known in the art may also be applied using embodiments of the present invention depending upon the particular TAWS application. The memory buffer cell 42 representations are shown, for illustrative purposes only, as identically sized and shaped squares.

The proportional spatial dimensions represented by the subset of terrain data from the geographic terrain database, which are dependent upon the length and direction of the search vector, are dependent upon the direction of travel for the aircraft and the aircraft speed. Larger proportional spatial dimensions will result in a larger subset of terrain data in the memory array 40 of the data buffer. The geographic dimensions of each subdivision of the geographic terrain database may be set to any scale by one of ordinary skill in the art.

After terrain data for an appropriate geographic region is copied into the spatial data buffer, each cell 42 of the memory array 40 contains elevation data for a corresponding subdivision of the geographic region. The cells 42 each include a maximum value of the terrain elevation within a geographic region corresponding to the cell for a search. The flight path for an aircraft 46, and search vector for the search, is shown as an arrow 44. The box 48 illustrates an approximate search width of interest around the primary flight path. Box 49 illustrates a list of cells, according to their position in the data array 40, which meet predetermined elevation search criteria. The cells may alternatively be identified in the list by other identifying indicia such as spatial coordinates, latitude and longitude, and the like.

Figure 8:
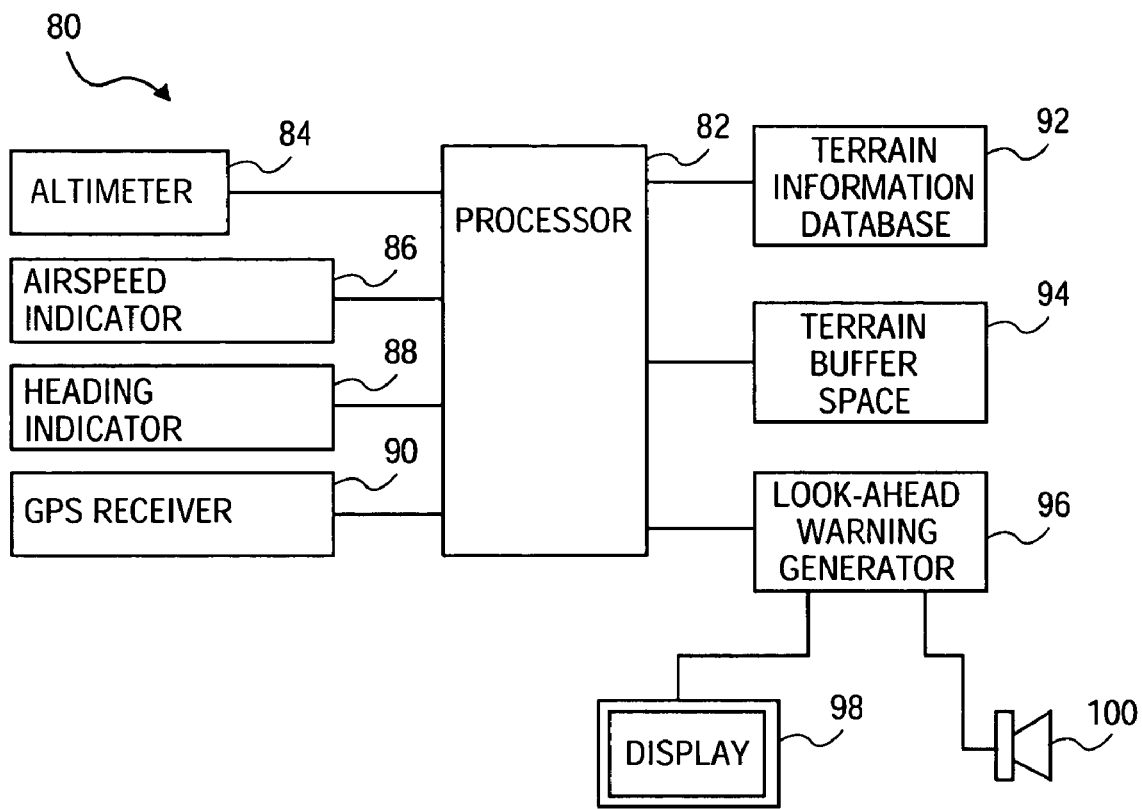
FIG. 8 is a system diagram of a TAWS configured according to an embodiment of the present invention.

FIG. 8 is a block diagram of a TAWS 80 for an aircraft configured according to an embodiment of the present invention. TAWS systems generally, their components and conventional avionics equipment are well known in the art and are governed by TSOs issued by the FAA. TAWS using satellite navigation information are also well known to those of ordinary skill in the art. The TAWS 80 of FIG. 8 includes a plurality of inputs to a central processor 82 where algorithms for methods of the present invention are executed. The central processor 82 may be a single processor with associated memory as is common in the art, or may be a plurality of processors associated with a number of different systems integral with or separate from the TAWS for performing all or a part of the processor function described herein. The inputs to the processor include signals from devices for collecting information relevant to the various calculations performed by the TAWS 80. Those inputs may include an altimeter 84, an airspeed indicator 86, a heading indicator 88, and a GPS receiver 90, all of which are common to conventional TAWS and are well known in the art. Alternatively, the GPS receiver 90 may be used to provide altitude, airspeed and heading indications. The system 80 also includes a geographic terrain information database 92 that includes at least elevation data for the geographic area over which the aircraft may fly. Embodiments of the present invention also include a terrain buffer space 94 comprising memory having data cells in which data associated with a portion of the geographic area may be stored. A look-ahead warning generator 96 evaluates the geographic locations identified as being of concern, and produces appropriate warnings by visual display 98 or aural warning 100. Visual display 98 may include display monitors, televisions, LED displays, blinking lights, digital and analog displays, and any other displays known for use with TAWS. Aural warnings 100 may include spoken recorded or synthesized voices, "beeps", or any other aural warnings known for use with TAWS.

Figure 5:
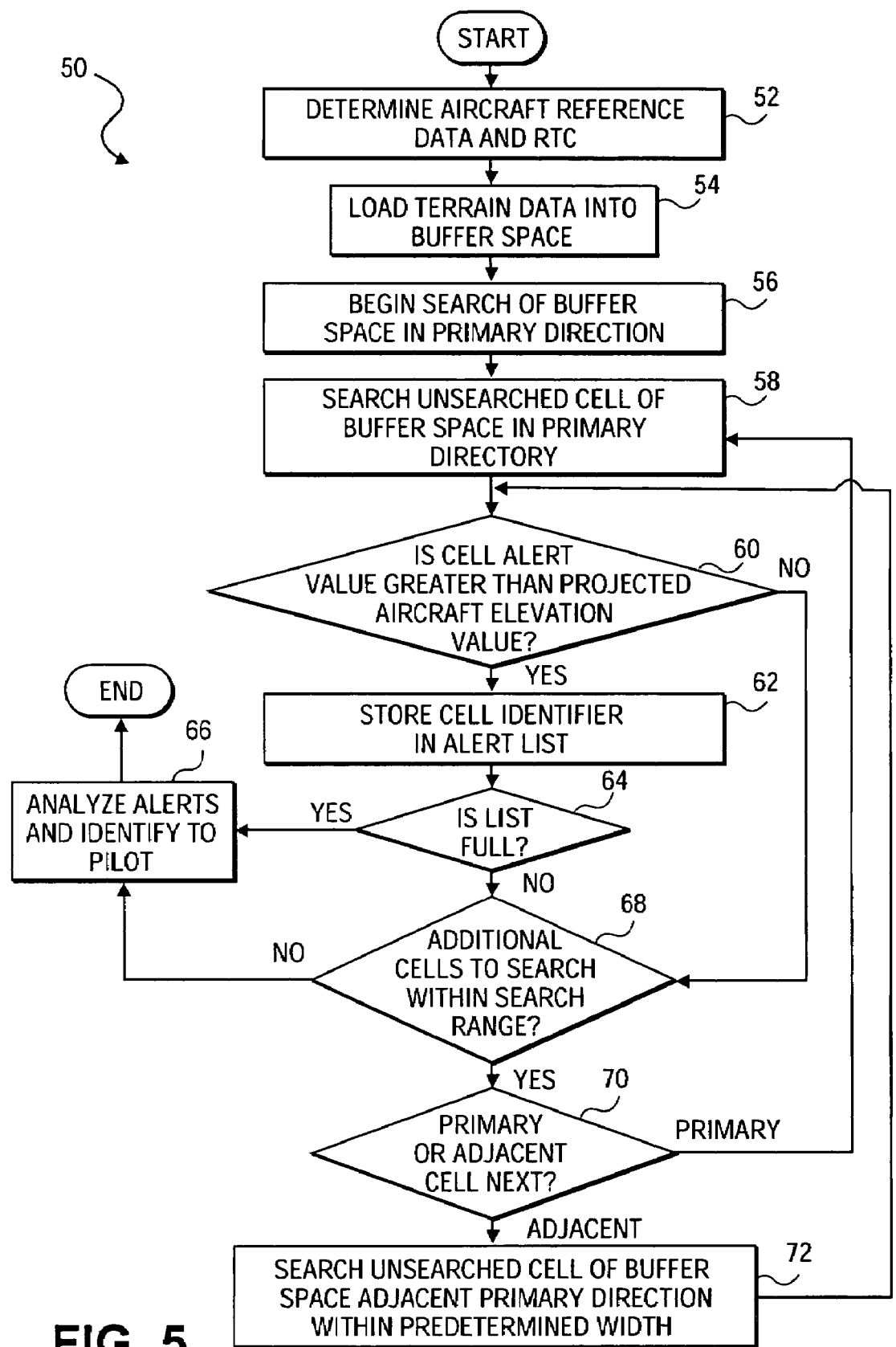
FIG. 5 is a flow diagram of a method of searching geographic information for a TAWS according to a particular embodiment of the present invention.

In reference to FIG. 5, a flow chart of an exemplary embodiment of a method 50 of the present invention is disclosed for use with a TAWS to search altitude data with respect to a geographic area through which an aircraft is flying. Reference to FIG. 8 will be used to clarify the elements used in the system. Using inputs to the TAWS, the aircraft's current location over a geographic region as determined from the GPS receiver 90, the aircraft's ground speed and vertical velocity as determined from the airspeed indicator 86 and GPS receiver 90, and the aircraft's direction of travel as determined from the heading indicator 88 and GPS receiver 90, are determined (Step 52). The aircraft's altitude and an appropriate RTC are also determined and identified for comparison. The RTC appropriate for a given situation depends upon a number of factors including the flight pattern of the aircraft (cruising, landing, take-off, etc.), the vertical speed of the aircraft, the classification of the aircraft, and other factors. Those of ordinary skill in the art will be able to select an appropriate RTC based upon FAA guidelines.

In reliance upon the aircraft's location, air speed, and direction of travel, as discussed above, a portion of a terrain information database 92 is identified and loaded into the terrain buffer space 94 (Step 54). The full size of the terrain buffer space 94 is selected based upon a safe look-ahead distance for the maximum air speed at which the aircraft may travel. Each time data is loaded into the terrain buffer space 94 as buffer data, a portion of the terrain buffer space 94 is configured to receive a data set having a predetermined dimension based upon a safe look-ahead distance for the actual air speed and heading of the aircraft.

After the elevation data for the pertinent geographic region is loaded into the terrain buffer space 94, a search of the buffer space may begin in the primary flight path direction (Step 56) according to a predetermined path and cell order through the buffer space 94. The exact sequence of cell search is not crucial, only that the most important cells to the particular aircraft be searched first. However, it has been found that by following a search path which moves forward a few cells in the direction of the flight path, returns to search a few cells adjacent to the flight path, moves forward to search an unsearched cell in the direction of the flight path, then returns again to search more cells adjacent the flight path, such as that shown in FIG. 3, the most pertinent cells are searched first. How many cells away from the primary flight path the search incorporates depends upon what width of search area is considered important for the given situation. For example, it may be determined that a passenger carrier aircraft flying straight may need at most only 1 nautical mile clearance on either side of the aircraft for safety, but when the aircraft is turning, may need 2 nautical miles clearance on either side of the aircraft. It may also be determined, as partially shown with the search pattern of FIG. 3, that to widen the search boundary adjacent the search path for some or all of the search path, or to even fan out the search area as the search distance from the aircraft increases may be desired to account for the possibility of variance in the path of the aircraft. However, even with a fan search pattern, the prioritized order of searching cells may be used to ensure each cell is searched only once and that priority cells are searched first, resulting in a non-linear prioritized search order.

It is also contemplated that the algorithm followed to determine the precise path order may change during sequential alert cycles depending upon the actions of the pilot, the flight behavior of the aircraft, or any number of other criterion. Any number of prioritized search path orders is possible and contemplated for use with the TAWS of the present invention. Whatever the search pattern, however, it is followed by the algorithm controlled by the processor 82 (FIG. 8) to identify geographic regions having elevations too close to the aircraft flight path altitude. The frequency at which alert cycles are performed may also be increased or decreased based upon various criterion such as the speed of the aircraft, when the plane is turning or descending, or when greater risk factors exist near the aircraft, such as increased close terrain or a runway or airport, to provide the pilot with more relevant information in a timely manner.

Figure 6:
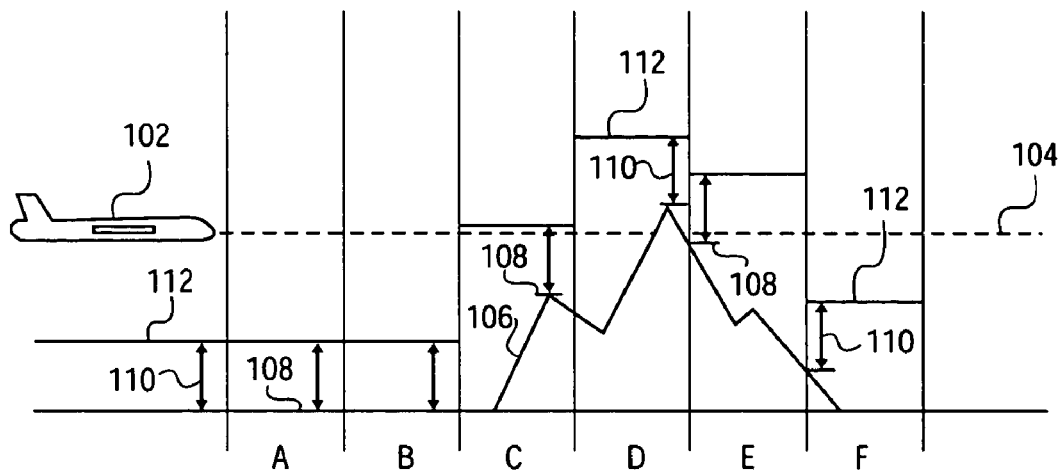
FIG. 6 is a side view of a flight path of an aircraft illustrating required terrain clearance boundaries for providing pilot alerts according to embodiments of the present invention.

In general terms, the search criteria for a cell may be any criteria relevant to the purpose for the search and the data contained in each cell. For a TAWS search, where each cell contains an elevation value, it is desirable to identify all cells having a clearance elevation value (elevation plus RTC), or alert value, greater than the aircraft's projected flight altitude for that cell. By establishing a clearance elevation value for each cell, a lower boundary is established. FIG. 6 is a graphical representation of this comparison showing an aircraft 102 flying on a projected flight path 104 through a spatial region subdivided into subdivisions A-F. For purposes of this example, each subdivision corresponds to a cell of the terrain buffer along the flight path and is represented in each buffer cell as an elevation value illustrated in FIG. 6 as lines 108. The highest elevation of terrain 106 in each spatial subdivision is stored in each respective buffer cell. Of course, even those cells without noticeable terrain still have an appropriate elevation value stored therein. The bidirectional arrows 110 represent the RTC value. Thus, the horizontal lines 112 represent the clearance elevation value for each cell. For simplification of this example, the aircraft 102 is illustrated flying parallel to the earth. Those of ordinary skill in the art will be readily able to determine the projected aircraft altitude at each cell given the aircraft's ground speed and vertical velocity. As a result, the projected aircraft altitude at each cell may be calculated, and appropriate alerts provided, independent from and without reference to the flight path angle of the aircraft.

Using the ground speed and vertical velocity of the aircraft, the flying altitude of the aircraft is projected out to each cell in the memory buffer for comparison. By projecting the aircraft flying altitude forward based upon its vertical velocity, the aircraft's present course may be evaluated against the terrain clearance boundary, and an appropriate alert provided when the projected aircraft altitude is below the terrain clearance boundary. For example, if the aircraft is cruising over terrain at approximately 5000 ft, the aircraft must maintain at least a 700-foot clearance between the aircraft and the terrain. Accordingly, 700 feet clearance is subtracted from the projected aircraft altitude when compared with each cell elevation value to compensate for the terrain clearance boundary through a projected aircraft safety altitude. Subtracting 700 feet from the projected aircraft altitude requires fewer resources than adding 700 feet to the elevation value of each cell. Nevertheless, in the alternative, 700 feet clearance may be added to the elevation value for each cell within the search area to create a terrain clearance boundary for comparison with the projected altitude of the aircraft. In either case, if the elevation of the aircraft has a projected altitude of 5700 feet at a cell, and the elevation value for the cell is only 3500 feet, no alert would be needed. Alternatively, if the elevation value for the cell were 5800 feet, the cell would be included within the alert list (element 49 of FIG. 4). For other embodiments with values stored in the cells, any number of various search criteria may be used to identify cells of interest such as: having a cell value below an alert value or between certain alert values, or cells having a specific alert value. By comparing a value relative to the aircraft's altitude with a lower boundary for the cell, it can be determined with a single comparison whether an alert may be needed for the cell.

With specific reference again to FIG. 5, the first cell to search is the first cell of the buffer space 94 in the primary flight path direction (Step 58). The alert value of the cell is then compared with the projected aircraft elevation (Step 60). If the alert value is greater than the aircraft elevation, for this embodiment, the cell identifier is stored in an alert list (Step 62). If the cell is stored in the alert list, a determination is made as to whether the list is full (Step 64). Whether the list is full depends upon a predetermined size for the alert list. Conventional systems search an entire region before determining what magnitude of alert to give and before actually providing the alert status to the pilot. Some advantages of selecting a predetermined number of alert elements to allow into the list is that alerts are produced to the pilot before the entire region has been searched, and the size of the alert list buffer needed is limited. In contrast, in a conventional system such as a conventional radial search pattern system, every radial arm of the search would need to be searched linearly in sequential order to its extent before an alert would be given to the pilot. For embodiments of the present invention, once the predetermined list length of alerts is identified, for example 20 alerts, the system stops searching the region and provides alerts to the pilot. If there are already 20 points of concern in the immediate, close flight path of the aircraft that will require the pilot of the aircraft to take action, the theory followed here is that there is no need to search the remainder of the region during this search pattern before providing alerts to the pilot. Larger or smaller alert list sizes, for example, 50-100 alerts, or even only 10 alerts, are also contemplated depending upon the needs of the particular alert system.

The ability of the present system to search less than the entire region before providing the alerts to the pilot is enabled by the cell search being performed in a prioritized order. Otherwise, the cells identified at any point in a search may not be the most relevant cells. Thus, if the list is full, the processor 82 and look-ahead warning generator 96 (FIG. 8) can calculate and mark the alerts for the pilot (Step 66), and begin the search pattern again from the beginning. If the alert list is not full (Step 64), or if the alert value is not greater than the projected aircraft elevation (Step 60), the processor 82 determines, based upon the original predetermined search order for the data cells, whether there are additional cells to be searched within the search range (Step 68). If there are no additional cells to search, the alerted cells are calculated and marked (Step 66) to complete this alert cycle. As used herein, an "alert cycle" is the time including the beginning of the search of a geographic region through providing the alerts to the pilot prior to beginning another search. For a conventional radial search method, the alert cycle includes searching linearly to the extents of each radial arm and then providing the results to the pilot. For a conventional sequential search method, the alert cycle includes linearly searching each of the rows or columns of cells in the region sequentially and then providing the results to the pilot. For particular embodiments of the present invention, for example the search order shown in FIG. 3, a search is performed in a non-linear manner, meaning that a search line is not followed to its extent before beginning another line. In this way, the search is capable of focusing on the most relevant and important locations in the spatial region closest to the aircraft prior to searching those further away from the aircraft so that alerts may be provided more quickly and using fewer calculations.

Referring again to FIG. 5, if additional cells to be searched exist, it is determined whether an adjacent or primary direction cell is next in the predetermined search order (Step 70). If the next cell in the search order is in the primary direction, the primary cell is searched (Step 58). If the next cell in the search order is an adjacent cell, the adjacent cell is searched (Step 72) and the search cycle determines whether the alert value for the next cell is greater than the projected aircraft elevation for that cell (Step 60), etc.

Copying a subset of the larger terrain information database to a terrain buffer and comparing the projected aircraft elevation against a single alert value for each cell eliminates significant processing and calculations as compared to conventional systems and methods. By searching the cells of the terrain data buffer in a predetermined prioritized order, cells for the buffer are only searched once for each alert cycle and the alert list is automatically prioritized, further reducing the processing and calculations required. By searching the terrain data buffer cells only until a predetermined number of alert cells have been identified, even further reduction of processing and calculations is achieved over conventional systems and methods.

Figure 7:
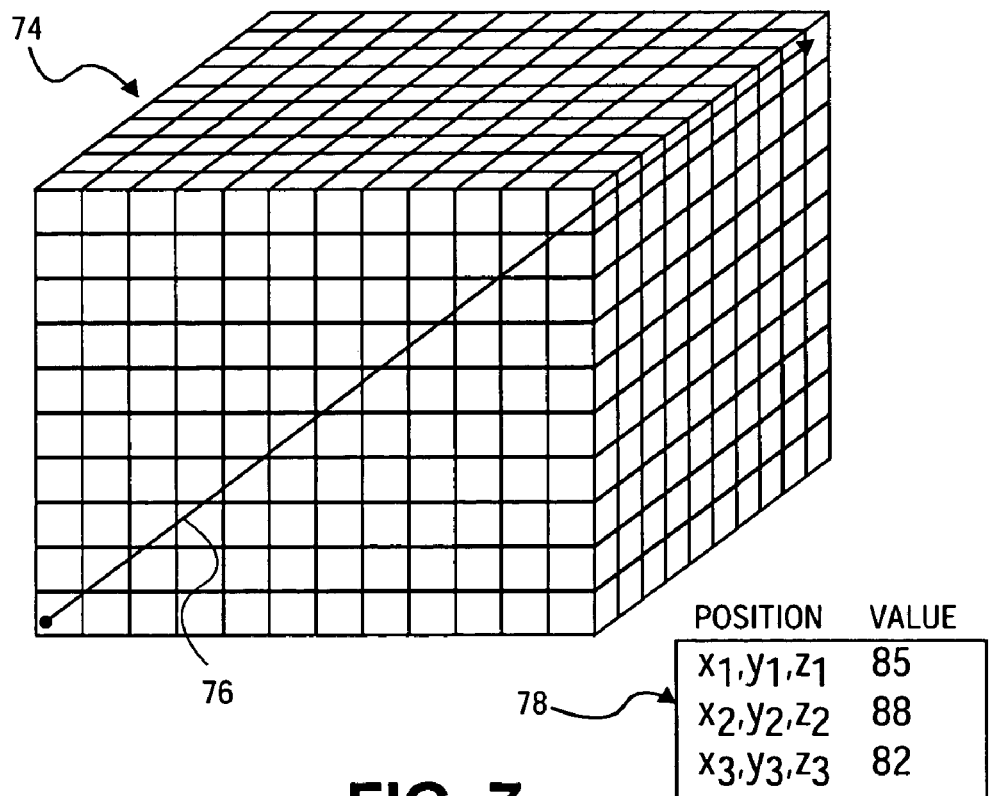
FIG. 7 is a three-dimensional spatial data grid indicating a search vector.

As illustrated in FIG. 7, methods of the present invention are also contemplated for spatial data sets 74 having three or even more (i.e. time, or other related data) dimensions. When a priority search vector path 76 through a data set can be determined, the prioritized search method of the spatial data may be used to significantly reduce the search processing and calculations necessary to identify which data along or adjacent the search vector path includes values meeting search criteria. The identified cells meeting the search criteria are included in an alert list 78.

Once a list of alert cells has been identified, the look-ahead warning generator 96 and/or the processor 82 (FIG. 8) analyze the data of each identified alert cell and generate appropriate alerts for the pilot. As explained previously herein, because the terrain data is searched in a prioritized order, the alert cells are stored in the alert list in a prioritized order and further organization is not required. Generally, and pursuant to current FAA requirements, alerts for TAWS are placed into two categories, Caution and Warning. For each alert cell in the list, a determination is made as to whether the alert should be a Caution or a Warning.

For each cell within the cell list, further analysis includes a time-based comparison to determine whether a pilot has sufficient time to correct the aircraft's flight path to clear the elevation clearance value for each alert cell. For the following equations: $T_{travel}$=aircraft travel time to geographic region corresponding to cell ($T_{travel}$ may be calculated by dividing the distance to the geographic region corresponding to the cell by the speed of the aircraft); $T_{puc}$=minimum time required for pilot to pull-up to clear terrain elevation with required terrain clearance ("RTC") amount without additional measures; $T_{rc}$=estimated pilot reaction delay time allowed for caution alert; $T_{puw}$=minimum time required for pilot to pull-up to clear terrain elevation; $T_{rw}$=estimated pilot reaction delay time allowed for warning alert. $T_{puc}$ and $T_{puw}$ are calculated using the assumption of constant pull-up and climb gradient given by FAA guidelines. $T_{rc}$ and $T_{rw}$ are calculated based upon predetermined research indicating pilot response times from receiving a warning plus additional time to provide a buffer to ensure clearance. Many of the elements of the calculations described herein are aircraft dependent and may be stored in a database table and accessed by the processor 82. By storing the relevant data in a look-up table that includes values for a plurality of aircraft types, the system thereby may include a scalable solution adaptable to a number of aircraft types. The actual duration for the additional buffer of time depends upon how far ahead of the latest response distance a pilot should receive an alert. A shorter buffer of time may result in fewer nuisance alerts given because the pilot has already made corrections. However, a shorter buffer of time will also reduce the available time to react and may result in more warning alerts being given. Because the time available to react to a warning alert is less than the time available to react to a caution alert, $T_{rw}$ is generally less than $T_{rc}$. RTC is the minimum clearance amount established by the FAA. Keep in mind that the cells identified in the alert list are only those for which the projected aircraft altitude is already below the lower boundary for the cell.

A first embodiment of the further analysis for each cell in the alert list involves a comparison of $T_{travel}$ with one or two time values as explained below:

First, if $T_{travel} < T_{puw} + T_{rw}$, a Warning alert should be issued for the cell because the time required for the pilot to pull-up to clear the terrain obstacle without additional measures plus the reaction time is greater than the time to travel to the region represented by the cell. If no action is taken, the danger of terrain impact is imminent. If the criteria of this equation is met and a Warning alert should be issued, no further comparison is needed and another cell may be analyzed.

Second, if $T_{travel} < T_{puc} + T_{rc}$, a Caution alert should be issued for the cell because the time required for the pilot to react and pull-up from the pilot's current flight path to clear the terrain obstacle by the RTC is greater than the time to travel to the region represented by the cell. If the pilot takes no action, the aircraft may enter that region without the required terrain clearance. If $T_{travel}$ is not less than $T_{puc} + T_{rc}$, no alert is needed. This condition is automatically discovered by virtue of the first two comparisons and no specific comparison is needed.

In this first embodiment of the analysis, some of the cells may be marked as Warning alerts, some of the cells may be marked as Caution alerts, and other of the cells may remain unmarked. These unmarked cells were indicated as cells where the flight path of the aircraft, if continued, would extend below the clearance elevation boundary. However, because the cells are still far enough out or relatively low enough in elevation for the pilot to easily correct the flight path to avoid the alert and may do so on his or her own without a warning, the alerts for these cells are not given until the cells are closer to the aircraft.

A second embodiment of the further analysis for each cell in the alert list involves a comparison of $T_{travel}$ with only one time value as explained below:

If $T_{travel} < T_{puw} + T_{rw}$, a Warning alert is issued for the cell because the time required for the pilot to pull-up to clear the terrain obstacle without additional measures plus the reaction time is greater than the time to travel to the region represented by the cell. If no action is taken, the danger of terrain impact is imminent.

In this second embodiment of the analysis, some of the cells may be marked as Warning alerts and the remainder of the alert cells will be marked as Caution alerts. Because each of the cells in the alert list were previously indicated as those cells in which the projected altitude of the aircraft is below the clearance elevation boundary, each of the alert cells are marked with an alert. The second embodiment of the analysis, in contrast to the first embodiment, will result in more Caution alerts being issued, but all of the alerts are for cells within the look-ahead distance and along or adjacent to the search vector. If these Caution alerts are too much of a nuisance, the look-ahead distance may be shortened to reduce the number of alerts given farther away, or a second comparison for a Caution alert time may be provided as with the first embodiment.

For the above equations described with relation to both the first and second embodiments of the analysis, if there is no need for the aircraft to pull-up to clear the terrain, $T_{puw}$ will be zero, and the equation for the Warning alert simply reduces to $T_{travel} < T_{rw}$. This insures that a more serious alert will be given when the aircraft gets closer to the obstacle, to make the pilot aware that the aircraft does not have the required terrain clearance even if the current altitude is above the terrain elevation.

Figure 9:
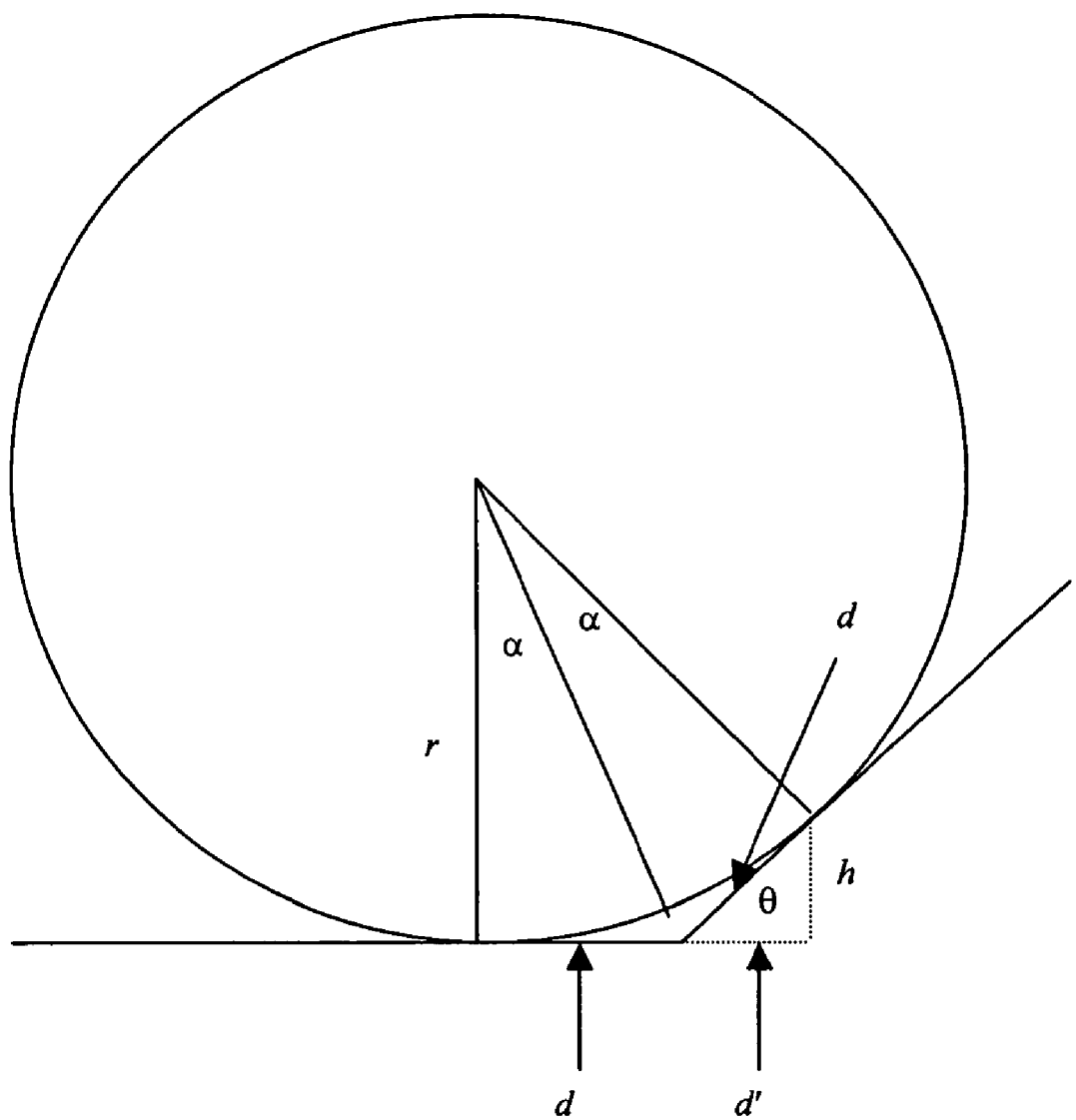
FIG. 9 is a curve diagram to assist in the description of time calculations for an aircraft achieving an additional altitude change.

Those of ordinary skill in the art will understand how to calculate $T_{travel}$, $T_{puw}$ and $T_{puc}$ and how to determine appropriate values for $T_{rc}$ and $T_{rw}$. The following, with reference to FIG. 9, is one approach to calculating $T_{puw}$ and $T_{puc}$. For the following explanation, the following values will be used and referenced:

a=centripetal acceleration (0.25 g per FAA guidelines)
v=ground speed
g=gravitational acceleration (9.8 meters/second$^2$)
θ=climb gradient (6.0 degree per FAA guidelines)
r=pull-up radius
d=horizontal distance traveled to the vertical turn bisector
d'=horizontal distance traveled after the vertical turn bisector
x=total distance traveled during the pull to climb gradient (sum of d and d')
h=altitude climbed during the pull-up to climb gradient
α=radial angle between present position and vertical turn bisector (α=θ/2)
$V_y$=vertical speed after pull-up $$a = v^2/r$$

$$0.25\,g = v^2/r$$

$$r = v^2/0.25\,g$$

$$\tan(\alpha) = d/r$$

$$d = r\tan(\alpha) = r\tan(\theta/2)$$

$$\sin(\theta) = h/d$$

$$h = d\sin(\theta)$$

$$d' = d\cos(\theta)$$

$$x = d + d'$$

$$V_y = v\tan(\theta)$$

To simplify the calculations, the velocity of the aircraft during and after pull-up may be approximated as a constant equal to the current velocity of the aircraft. Using this basic understanding of the relationships between the constants and variables provided above, $T_{puw}$ and $T_{puc}$ may be calculated as follows:

$t_p$=time spent during pull-up=(x/v)
$h_w$=required change in height to clear terrain=terrain elevation−current altitude
$h_c$=required change in height to clear clearance elevation=$h_w$+RTC $$T_{puw} = ((h_w - h)/V_y) + t_p$$

$$T_{puc} = ((h_c - h)/V_y) + t_p$$

In summary, $T_{puw}$ and $T_{puc}$ may be determined by calculating the time spent during the pull-up on a circular track (FIG. 9) until a constant climb gradient of 6 degrees is reached and assuming the aircraft flies at a constant vertical velocity until the intended height is cleared. Comparison of the time which will likely be spent during pull-up, plus a response time, to the total travel time to the region determines whether the pilot must act soon (caution), or more immediately (warning) to clear the upcoming terrain with the necessary clearance.

Figure 10:
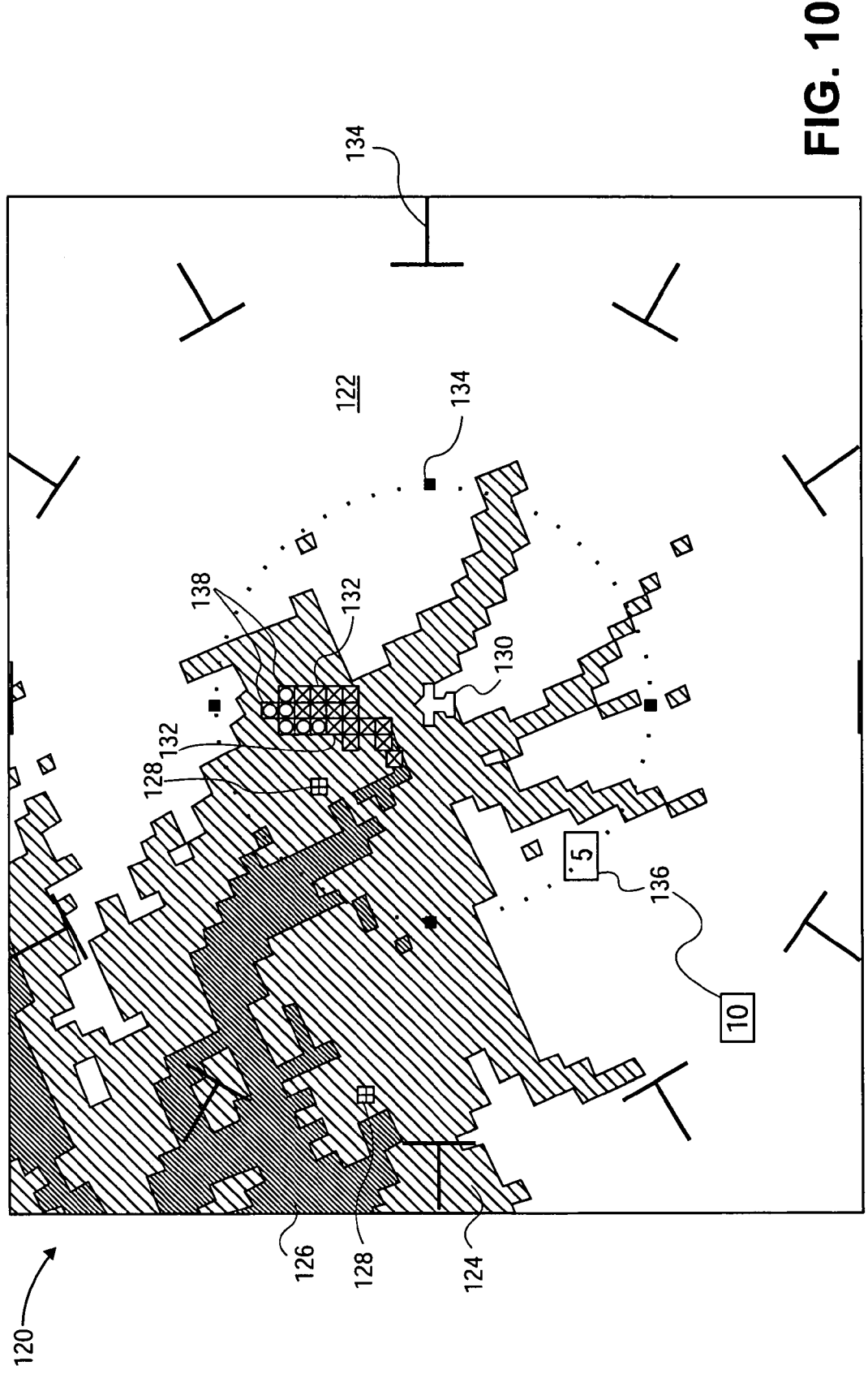
FIG. 10 is a plan view of a terrain display in accordance with an embodiment of the present invention.

FIG. 10 illustrates one example of a display, such as that referenced in FIG. 8 as element 98, for use with embodiments of the present invention. Other display methods and devices are well known in the art and will also serve to display data produced by the methods and apparatus disclosed herein. As shown in the method described with reference to FIG. 5, once the list is full (Step 64) or there are no other cells to search within the search range (Step 68), and the appropriate alerts have been calculated and analyzed (Step 66), the alerts are marked or otherwise produced for reference by the pilot (Step 66). The display 120 of FIG. 10 shows terrain information identifying terrain elevation with reference to the aircraft 130 altitude for a geographic region corresponding to the display 120. The display includes radial distance markers 134 indicating the radial ground distance from the aircraft to the region on the display. Radial distance marker 134 rings may also include distance indicators 136. Other indicators such as the position of the aircraft, latitude, longitude, ground speed, vertical velocity, other indicators conventionally found in an aircraft display, and the like, may also be included.

The underlying geographic region may be displayed in any method or in any configuration known or used in the art. However, in particular embodiments of the display of the present invention, such as that shown in FIG. 10, the terrain information identifying terrain elevation with reference to the aircraft 130 is shown in three colors, each color corresponding to a relative elevation. For example, underlying terrain elevation information 122 may be displayed in a first color, such as white or black, for all terrain having an elevation more than, for example, 2000 feet below the current altitude of the aircraft. Terrain elevation information 124 for all terrain having an elevation between, for example, 2000 feet and 500 feet below the current altitude of the aircraft 130 may be displayed in a second color, such as yellow. A third color, such as red, may be used to display terrain information 126 for all terrain having an elevation less than, for example, 500 feet below the current altitude of the aircraft 130.

In addition to the terrain information being displayed, and pursuant to Step 66 of FIG. 5, the display also includes an indication of those regions that need alert indicators. The Caution and Warning alerts, 138 and 132 respectively, are displayed over the existing terrain information as a different color or as a symbol over those Caution or Warning regions identified through the methods related to the present invention. For those regions identified as needing an alert, a distinguishing mark, such as a symbol, pattern, color, color or pattern density, or other identifying mark, may be provided in place of or in addition to the corresponding terrain display region on the display. For the example shown in FIG. 10, a box 132 with an "X" in it is shown on the display over regions corresponding to terrain data identified as needing a Warning alert. Similarly, a box 138 with an "O" in it is shown on the display over regions corresponding to terrain data identified as needing a Caution alert. Other indicators may include distinct identifiers for obstacles other than terrain, such as a smoke stack or tower. For example, FIG. 10 illustrates two boxes 128 shown with a "+" therein to represent other non-terrain tall obstacles. Like the terrain alerts, obstacles or other indications may be identified by a particular symbol, shape, texture, color, or the like, and may also be specifically identified if the same cell is identified for an alert. In this way, the terrain or obstacle itself may be displayed in varying color or pattern based upon its alert level determined by the methods and apparatus of the present invention.

The embodiments and examples set forth herein were presented to best explain the present invention and its practical application and to thereby enable those of ordinary skill in the art to make and use the invention. However, those of ordinary skill in the art will recognize that the foregoing description and examples have been presented for the purposes of illustration and example only. The description as set forth is not intended to be exhaustive or to limit the invention to the precise form disclosed. Many modifications and variations are possible in light of the teachings above without departing from the spirit and scope of the forthcoming claims.

The invention claimed is:

1. A terrain awareness and warning system (TAWS) for an aircraft, the TAWS comprising:
   a terrain information database configured to store a plurality of data cells corresponding to elevation information for a terrain region;
   a terrain buffer configured to receive and store data cells corresponding to a portion of the terrain region;
   a look-ahead warning generator configured to receive indications of terrain clearance alerts and communicate the indications by at least one of a visual display and an aural warning; and
   a processor coupled to each of the terrain information database, the terrain buffer, and the look-ahead warning generator, the processor configured to—
      identify a search vector based at least upon a position of the aircraft and a velocity of the aircraft,
      search the data cells stored within the terrain buffer in a predetermined prioritized order to compare a projected altitude of the aircraft with the elevation information associated with the searched cells, and
      based on the comparison, provide an indication of a terrain clearance alert to the look-ahead warning generator,
   wherein the predetermined prioritized order includes searching at least a first cell on the search vector, then searching at least a second cell adjacent the search vector, and then searching at least a third cell on the search vector ahead of the first cell.

2. The TAWS of claim 1, wherein the processor is further operable to select data cells from the terrain information database for storage within the terrain buffer based on the identified search vector.

3. The TAWS of claim 1, wherein the search vector is identified based on the position of the aircraft, the velocity of the aircraft, and a projected flight path of the aircraft.

4. The TAWS of claim 1, wherein the predetermined prioritized order includes—
   searching a first plurality of cells on the search vector, where the first cell is a first one of the first plurality of cells,
   then searching at least the second cell, where the second cell is adjacent the search vector and the first cell,
   then searching at least the third cell, where the third cell is ahead of each of the first plurality of cells, and
   then searching at least a fourth cell which is adjacent the search vector and the second or third cell.

5. The TAWS of claim 1, wherein the processor is further configured to monitor movements of the aircraft and responsively modify the predetermined prioritized order.

6. The TAWS of claim 1, wherein the processor is further configured to provide data to the visual display representing the elevation information for the terrain region in relation to a flying altitude of the aircraft for display in conjunction with the terrain clearance alerts.

7. The TAWS of claim 1, wherein the processor is further operable to, based on the comparison of the projected altitude of the aircraft with the elevation information associated with the searched cells, store identifiers corresponding to one or more of the searched cells in an alert list and provide the indication of the terrain clearance alert to the look-ahead warning generator based on the contents of the alert list.

8. A terrain awareness and warning system (TAWS) for an aircraft, the TAWS comprising:
   a terrain information database configured to store a plurality of data cells corresponding to elevation information for a terrain region;
   a terrain buffer configured to receive and store data cells corresponding to a portion of the terrain region;
   a look-ahead warning generator configured to receive indications of terrain clearance alerts and communicate the indications by at least one of a visual display and an aural warning; and
   a processor coupled to each of the terrain information database, the terrain buffer, and the look-ahead warning generator, the processor configured to—
      identify a search vector based at least upon a position of the aircraft and a projected flight path of the aircraft,
      search the data cells stored within the terrain buffer in a predetermined prioritized order to compare a projected altitude of the aircraft with the elevation information associated with the searched cells,
      based on the comparison, store identifiers corresponding to one or more of the searched cells in an alert list, and
      provide an indication of a terrain clearance alert to the look-ahead warning generator based on the contents of the alert list,
   wherein the predetermined prioritized order includes—
      searching a first plurality of cells on the search vector, where a first cell is a first one of the first plurality of cells,
      then searching at least a second cell, where the second cell is adjacent the search vector and the first cell,
      then searching at least a third cell, where the third cell is on the search vector and ahead of each of the first plurality of cells, and
      then searching at least a fourth cell which is adjacent the search vector and the second or third cell.

9. The TAWS of claim 8, wherein the processor is further operable to select data cells from the terrain information database for storage within the terrain buffer based on the identified search vector.

10. The TAWS of claim 8, wherein the processor is further configured to monitor movements of the aircraft and responsively modify the predetermined prioritized order.

11. The TAWS of claim 8, wherein the processor is further configured to provide data to the visual display representing the elevation information for the terrain region in relation to a flying altitude of the aircraft for display in conjunction with the terrain clearance alerts.

12. A method of providing a terrain warning for an aircraft using a terrain awareness and warning system (TAWS), the method comprising:
   accessing with the TAWS a terrain buffer including a plurality of data cells corresponding to elevation information for a portion of a terrain region;
   identifying with the TAWS a search vector based at least upon a position of the aircraft and a velocity of the aircraft;
   searching with the TAWS the data cells stored within the terrain buffer in a predetermined prioritized order to compare a projected altitude of the aircraft with the elevation information associated with the searched cells; and
   based on the comparison, provide with the TAWS an indication of a terrain clearance alert, wherein the predetermined prioritized order includes searching at least a first cell on the search vector, then searching at least a second cell adjacent the search vector, and then searching at least a third cell on the search vector ahead of the first cell.

13. The method of claim 12, further including selecting data cells from a terrain information database for storage within the terrain buffer based on the identified search vector.

14. The method of claim 12, wherein the search vector is identified based on the position of the aircraft, the velocity of the aircraft, and a projected flight path of the aircraft.

15. The method of claim 12, wherein the predetermined prioritized order includes— searching a first plurality of cells on the search vector, where the first cell is a first one of the first plurality of cells, then searching at least the second cell, where the second cell is adjacent the search vector and the first cell, then searching at least the third cell, where the third cell is ahead of each of the first plurality of cells, and then searching at least a fourth cell which is adjacent the search vector and the second or third cell.

16. The method of claim 12, further including monitoring movements of the aircraft and responsively modifying the predetermined prioritized order.

17. The method of claim 12, further including, based on the comparison of the projected altitude of the aircraft with the elevation information associated with the searched cells, storing identifiers corresponding to one or more of the searched cells in an alert list and providing the indication of the terrain clearance alert based on the contents of the alert list.

* * * * *